April 18, 1950 S. A. BROSKY 2,504,389
METHOD AND APPARATUS FOR X-RAY ANALYSIS
Filed April 24, 1945 2 Sheets-Sheet 1
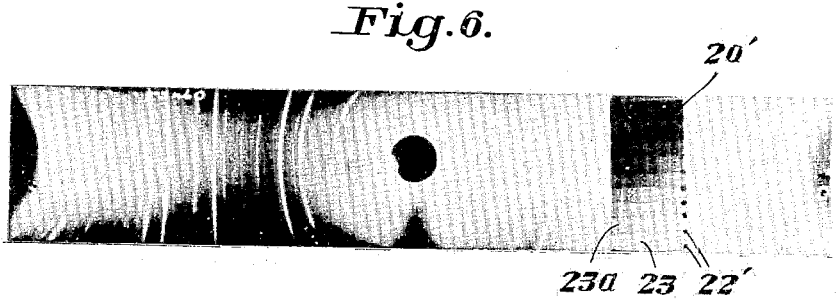
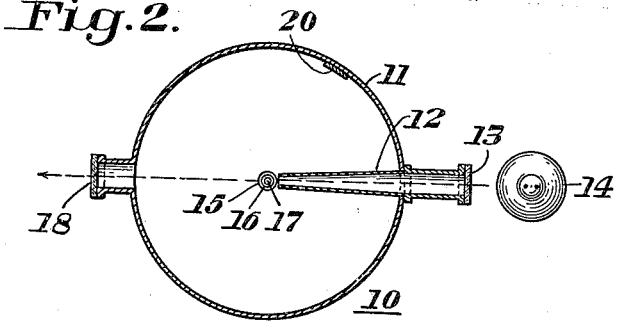
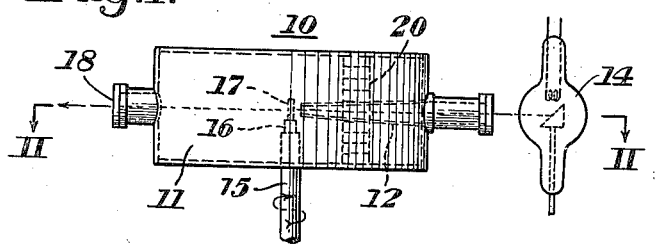
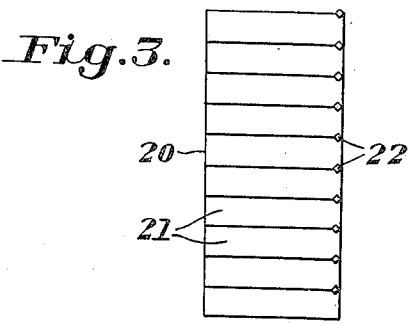 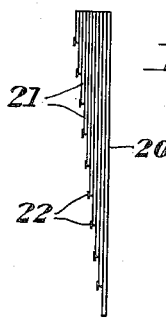
INVENTOR
Stanley A. Brosky
by his attorneys
Stebbins, Blenko & Webb

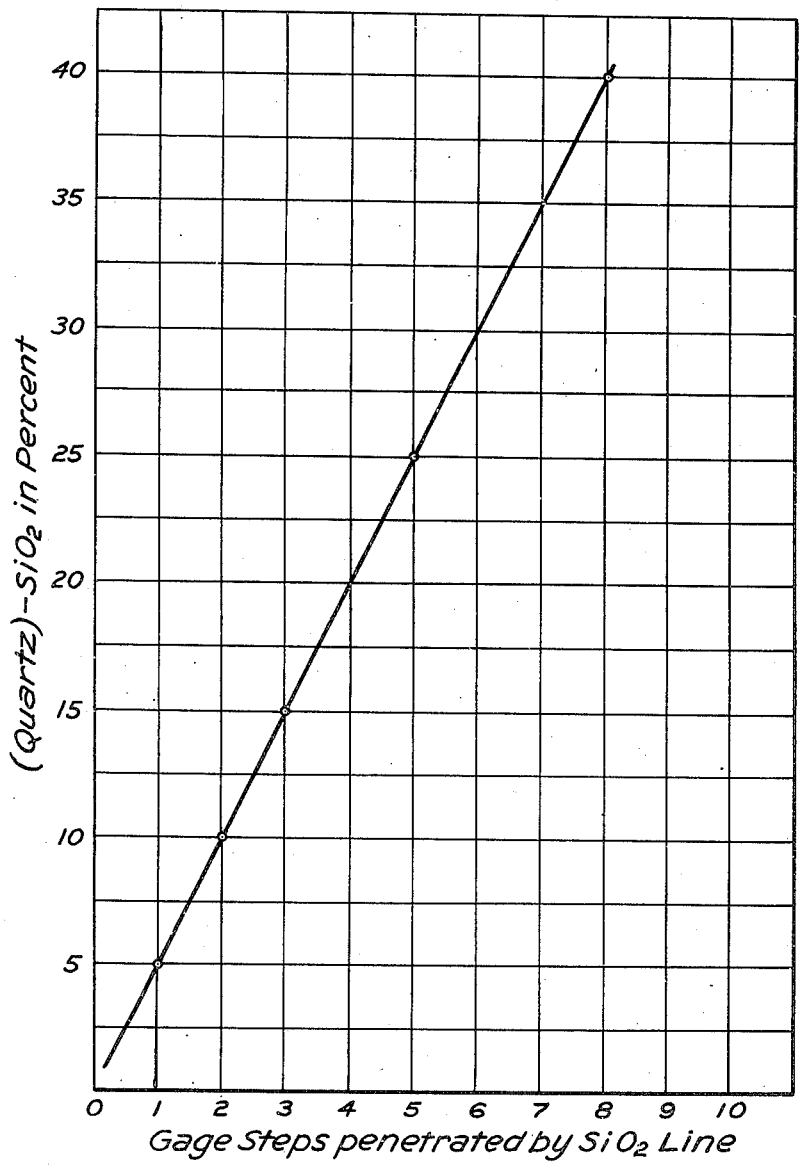

Patented Apr. 18, 1950

2,504,389

UNITED STATES PATENT OFFICE 2,504,389

METHOD AND APPARATUS FOR X-RAY ANALYSIS

Stanley A. Brosky, Carnegie, Pa., assignor to Pittsburgh Testing Laboratory, Pittsburgh, Pa., a corporation of Pennsylvania Application April 24, 1945, Serial No. 590,017

2 Claims. (Cl. 250—53)

This invention relates to a method and apparatus for determining the concentration of a substance, either a compound or element, in a mixture by X-ray analysis.

There are many cases in which it is desirable to obtain an indication of the percentage of a particular compound or element of a mixture in a time shorter than that required by the usual methods of chemical analysis. I have invented a method and apparatus for obtaining such determination by utilizing the diffraction pattern obtained in X-ray analysis by the powder method.

It is well known that various elements and compounds produce lines in X-ray diffraction patterns characteristic of no other compound. That is to say, the diffraction pattern produced by the known method of X-ray analysis using a sample in powder form reveals the character of the sample as to the compounds present therein. My invention provides a technique for obtaining a quantitive indication from which the percentage of a given compound or element present in the mixture may be determined much more quickly than by the methods of ordinary chemical analysis.

In a preferred practice of the invention, I utilize a screen of varying transparency to X-rays and place the screen in front of the film mounted in a camera adapted for taking X-ray diffraction patterns by the powder method. The screen is so positioned in the camera as to overlie the portion of the film on which the lines characteristic of the particular substance in question will appear. The transparency of the screen to X-rays varies along the length of such lines so that the proportion of the lines visible on the film indicates the concentration of the particular compound of which they are characteristic. That is, the greater the concentration of the compound in the mixture, the more intense will be the characteristic lines on the film and the greater the penetration of the screen.

The screen preferably takes the form of a plurality of plies of metal foil superposed in stepped relation whereby the number of plies or thicknesses increases from one end of the screen toward the other.

A complete understanding of the invention will be gained from the following detailed description and explanation which refer to the accompanying drawings illustrating the camera diagrammatically, the screen of varying transparency, a calibration chart associated therewith and the film obtained with a particular mixture. In the drawings, Figure 1 is an elevation of a camera suited for X-ray analysis by the powder method;

Figure 2 is a horizontal section therethrough taken along the plane of line II—II of Figure 1;

Figure 3 is a front elevation of the screen of varying transparency;

Figure 4 is a side elevation thereof;

Figure 5 is a calibration curve for the screen shown in Figures 3 and 4; and

Figure 6 is the film record obtained, showing the shadow of the screen thereon and the penetration of lines characteristic of the compound in question for a portion of the height of the screen.

Referring now in detail to the drawings, a camera 10 suited for X-ray analysis of a sample in powder form comprises a light-tight cylindrical box 11 having a radial focusing tube 12 terminating at its outer end in a window 13 through which X-rays may be delivered from a tube 14 of conventional construction. At its inner end, the tube 12 terminates adjacent a spindle 15 suitably mounted for continuous rotation by any convenient driving means. A sample holder 16 is mounted in the upper end of the spindle, the sample proper being indicated at 17. A window 18 opposite the tube 12 is provided to permit the egress of undiffracted rays.

In order to determine the intensity of the lines in the diffraction photograph characteristic of certain compounds, I employ a screen 20 composed of a plurality of plies of material assembled in partially overlapping stepped relation, as shown in Figures 3 and 4. The screen 20 may conveniently be made of layers 21 of aluminum foil .0008" thick. The plies may be secured together by any suitable form of adhesive. When the plies are assembled, the result is a rectangular screen having a transparency to X-rays which decreases along its length from the end at which the thickness is a minimum to that at which it is a maximum. The transparency varies in steps with the addition of each successive ply or piece of foil. Gage marks 22 such as small pieces of lead, for example, are preferably secured to one edge of the screen adjacent the exposed ends of the successive plies of foil for a purpose which will appear later.

In using the screen 20, it is located as shown in Figures 1 and 2 so that certain lines on the diffraction photograph will be taken through the screen which thus appears as a shadow on the finished photograph (see Figure 6) partially obscuring the characteristic lines, the extent of the obscuration being dependent on the intensity of the lines. It will be understood that in making the photograph reproduced in Figure 6, a strip of film is inserted in the camera 10 extending around practically the entire circumference of the side wall. Figure 6 is a diffraction photograph obtained from a specimen of mine dust for the purpose of determining the percentage of silica therein. The line characteristic of silica appears in the photograph at 23 and is partly obscured by the shadow of the screen 20 designated 20'. The length of the line 23 or its height from the lower edge of the screen is a measure of its intensity since the greater the intensity, the greater will be the penetration of the screen by the rays and the higher up on the photograph the line will be visible through the shadow of the screen. The gage markers 22 leave shadows 22' on the photograph making it easy to count the number of plies or thicknesses of foil penetrated sufficiently by diffracted rays to affect the film.

When a photograph such as that shown in Figure 6 has been obtained, it may be readily evaluated by reference to a calibration curve such as shown in Figure 5. This curve is drawn from the lengths of the characteristic lines in diffraction photographs through specimens having known percentages of the compound in question. The curve shown in Figure 6 is for silica ($SiO_2$). It will be apparent from Figure 6 that the silica line has penetrated four thicknesses or plies of the screen and it will be observed from Figure 5 that this corresponds to 20% silica in the sample under examination.

The sample is prepared in the usual manner for X-ray analysis by the powder method. I preferably add to the sample a compound such as nickel oxide serving as an internal standard. A 1:1 mixture of this compound and the sample may conveniently be used in forming the extruded rod shown at 17 which is rotated in the X-ray beam. This internal standard prevents improper preparation of the sample and also the variation in the intensity of the characteristic line resulting from the mode of preparation of the sample. In other words, the internal standard gives significance to a comparison between successive samples. The reason for this is that for a given percentage of the nickel oxide, the line characteristic thereof, i. e., 23a, should show to a definite height through the screen. Any variation from this height requires corresponding correction of the observed height of the line characteristic of silica or other compound being analyzed.

The method and apparatus of my invention make it possible to analyze mixtures with an accuracy within 1 or 2% in a relatively short time such as an hour or two, as compared with two days which is required for chemical analysis by ordinary methods. In addition, the use of the X-ray diffraction pattern for analysis makes it possible to distinguish between different types of quartz ($SiO_2$) which are indistinguishable by chemical analysis.

The screen may be broadened to cover the entire length of the film. Preferably, however, it is not extended beyond one-half the film length. With this arrangement, the unscreened half of the film reveals the character of the composition while the screened half reveals the percentage of the various compounds by the indication of their intensity, i. e., the length of the portion which is visible through the screen.

While the use of the invention has been explained in connection with the analysis of mine dust to obtain the percentage of silica therein, it will be understood that this is merely by way of example and that the invention may be used for the analysis of mixtures containing any compound or element exhibiting a characteristic line in an X-ray diffraction photograph.

Although I have illustrated and described but a preferred embodiment and practice of the invention, it will be recognized that changes in the details of construction and procedure may be made without departing from the spirit of the invention or the scope of the appended claims.

I claim:

1. A method of quantitative analysis for determining the concentration of a crystalline substance in a mixture, which comprises subjecting the mixture to X-rays, passing the X-rays diffracted by the substance in the mixture through a screen of graduated X-ray transparency onto a photo-recording means, comparing the extent to which the screen is penetrated by the diffracted rays as shown on the photographic record with the extent of screen penetration by X-rays diffracted by known concentrations of the substance photographed under substantially the same conditions, and thereby determining the amount of the unknown concentration, the extent of screen penetration being proportional to the concentration of the substance.

2. A method of quantitative analysis for determining an unknown concentration of a crystalline substance in a mixture, which comprises subjecting the mixture to primary X-rays and passing resultant diffracted X-rays characteristic of the crystalline substance through a screen of graduated X-ray transparency onto a photo-recording means, establishing a basis of comparison with other mixtures containing known concentrations of the substance by subjecting each of said other mixtures to like primary X-rays and in each case passing like resultant diffracted X-rays through a like screen onto a like photo-recording means, the primary X-rays in all cases being of known relative intensity, inspecting and comparing the photo-recording means to determine the relative screen penetration and thus the relative proportions of the intensities of like X-rays diffracted by the substance in the respective mixtures, and on the basis of the proportions so obtained determining from the amounts of the known concentrations the amount of the unknown concentration.

STANLEY A. BROSKY.

REFERENCES CITED

The following references are of record in the file of this patent:

UNITED STATES PATENTS

| Number | Name | Date |
|---|---|---|
| 1,531,620 | Meyer | Mar. 31, 1925 |
| 1,546,349 | Hull et al. | July 14, 1925 |
| 1,973,906 | Levene et al. | Sept. 18, 1934 |
| 2,387,887 | Dimsdale et al. | Oct. 30, 1945 |
| 2,399,650 | Moyer | May 7, 1946 |